(12) United States Patent
Vakharia

(10) Patent No.: US 9,874,450 B2
(45) Date of Patent: Jan. 23, 2018

(54) REFERENCING CLOSED AREA GEOMETRY

(71) Applicant: HERE Global B.V., Eindhoven (NL)

(72) Inventor: Kaushik Vakharia, Naperville, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/140,819

(22) Filed: Apr. 28, 2016

(65) Prior Publication Data
US 2017/0314935 A1    Nov. 2, 2017

(51) Int. Cl.
*G01C 21/32* (2006.01)
(52) U.S. Cl.
CPC ..................... *G01C 21/32* (2013.01)
(58) Field of Classification Search
CPC ..................................... G01C 21/32
See application file for complete search history.

(56) References Cited

U.S. PATENT DOCUMENTS

| | | | | |
|---|---|---|---|---|
| 7,933,897 | B2 * | 4/2011 | Jones | G06F 17/30241 707/723 |
| 8,681,176 | B1 * | 3/2014 | Maurer | G01C 21/367 340/995.1 |
| 9,311,750 | B2 * | 4/2016 | Moore | G01C 21/00 |
| 9,418,672 | B2 * | 8/2016 | Pylappan | H04L 5/00 |
| 2002/0067379 | A1 * | 6/2002 | Kenyon | G06F 17/30241 715/838 |
| 2010/0002012 | A1 * | 1/2010 | Andreasson | G01S 19/14 345/619 |
| 2010/0082564 | A1 * | 4/2010 | Fernekes | G06F 17/30241 707/705 |
| 2010/0194784 | A1 * | 8/2010 | Hoff | G06F 3/0488 345/661 |
| 2011/0177845 | A1 * | 7/2011 | Fasold | G09B 29/007 455/566 |
| 2011/0306304 | A1 * | 12/2011 | Forutanpour | G06F 3/04883 455/67.11 |
| 2013/0241953 | A1 * | 9/2013 | Futatsugi | G01C 21/367 345/629 |
| 2013/0321450 | A1 * | 12/2013 | Hultquist | G01C 21/26 345/619 |
| 2014/0104197 | A1 * | 4/2014 | Khosravy | G01C 21/3664 345/173 |
| 2014/0141803 | A1 * | 5/2014 | Marti | H04W 4/043 455/456.2 |
| 2014/0344296 | A1 * | 11/2014 | Chawathe | G06F 17/30241 707/755 |
| 2015/0020008 | A1 * | 1/2015 | Pensack-Rinehart | G06F 3/04847 715/765 |
| 2015/0370828 | A1 * | 12/2015 | Maurer | G06F 17/30061 707/722 |
| 2017/0122750 | A1 * | 5/2017 | Pfeifle | G01C 21/34 |
| 2017/0132934 | A1 * | 5/2017 | Kentley | G08G 1/202 |

FOREIGN PATENT DOCUMENTS

| | | | | |
|---|---|---|---|---|
| DE | 102013200181 A1 * | 7/2014 | | G01C 21/32 |
| EP | 2626668 A1 * | 8/2013 | | G01C 21/32 |

* cited by examiner

*Primary Examiner* — Tuan C To
(74) *Attorney, Agent, or Firm* — Lempia Summerfield Katz LLC

(57) ABSTRACT

Embodiments includes systems and methods for referencing a dynamic closed geometry event to a map tile for a navigation application. The dynamic closed geometry event changes in geographic coverage area over time. In response to receipt of data indicative of the dynamic closed geometry event in map agnostic coordinates, a processor, identifies a map tile level for the navigation application and identifies at least one map tile identifier for the dynamic closed geometry event. Multiple map tile offsets are calculated based on the map tile level and the dynamic closed geometry event and sent to the navigation application.

20 Claims, 13 Drawing Sheets

REFERENCING CLOSED AREA GEOMETRY

FIELD

The following disclosure relates to a closed area geometry referenced to a map tile, and more particularly, map applications and navigation application using a closed area geometry that changes shape and/or position over time and is referenced to a map tile.

BACKGROUND

Various technologies have been developed that provide navigation-related and map-related services. For example, vehicle navigation systems can determine where a person or a vehicle is located and provide directions to travel to a desired destination. Other navigation-related services may provide other information to mobile users based on the location. Also, internet sites provide maps, directions for traveling to a desired destination from a specified starting point, and other map-related services.

In order to provide these and other map-related functions and features, navigation systems use geographic data. The geographic data may be in the form of one or more geographic databases that include data representing physical features in the geographic region. The geographic data may be referenced to a variety of coordinate systems.

Some geographic entities are naturally described using existing referencing formats but other geographic entities such as closed area geometries may be computationally intensive for navigation systems.

SUMMARY

In one embodiment, a method for referencing a dynamic closed geometry event to a map tile for a navigation application includes receiving data indicative of the dynamic closed geometry event in map agnostic coordinates, wherein the dynamic closed geometry event changes in geographic coverage area over time. A processor identifies a map tile level for the navigation application, and, based on the identified map tile level, identifies at least one map tile identifier for the dynamic closed geometry event based on the identified map tile level. From the at least one map tile identifier and the data indicative of the dynamic closed geometry event, the processor calculates a plurality of map tile offsets. The at least one map tile identifier and the plurality of map tile offsets are sent to the navigation application.

In one embodiment, a method for referencing a dynamic event in a map tile includes identifying a map tile level for a navigation application, sending a request from the navigation application for dynamic events, wherein the dynamic events change in geographic coverage area over time, receiving, based on the identified map tile level for the navigation application, at least one map tile identifier and a plurality of map offsets for a dynamic event, and providing an indication of the dynamic event using the navigation application based on the at least one map tile identifier and the plurality of map offsets.

In one embodiment, an apparatus includes a position sensor, a controller, and a communication interface. The position sensor is configured to determine a geographic position associated with a mobile device. The controller configured to identify a map tile level for a navigation application of the mobile device. The communication interface configured to send a request for dynamic events, wherein the request includes the map tile level and the geographic position, and configured to receive at least one map tile identifier and a plurality of map offsets for a dynamic event.

BRIEF DESCRIPTION OF THE DRAWINGS

Exemplary embodiments of the present invention are described herein with reference to the following drawings.

DETAILED DESCRIPTION

Figure 1:
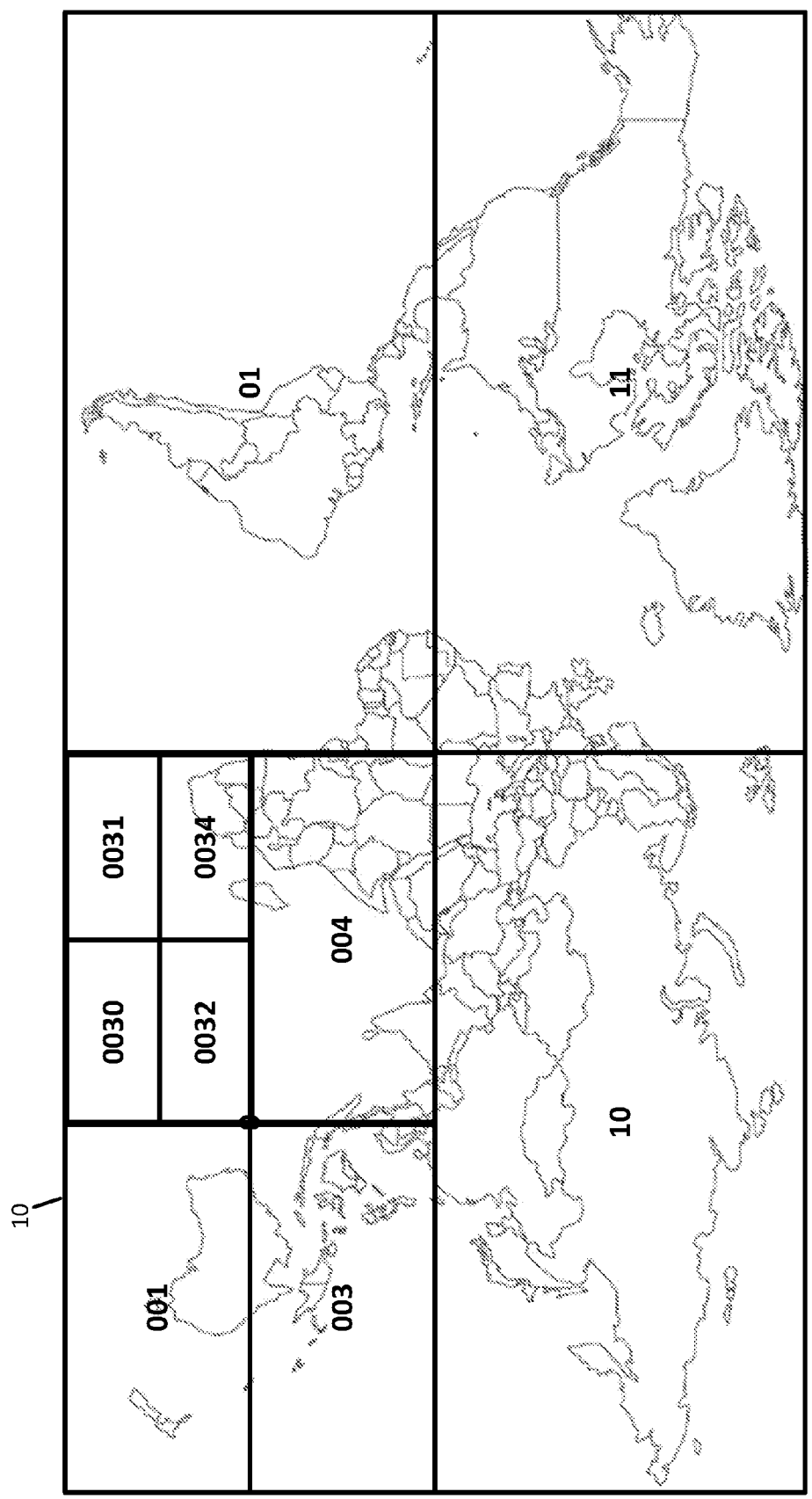
FIG. 1 illustrates an example map tile grid.

A geographic database may primarily comprise road links or road segments and nodes. Every road surface in the geographic database may be assigned a unique identifier for the link and be associated with the link identifier, the geographic database stores a starting point, and end point, a path attribute (e.g., shape), a length (e.g., geometry), a direction of travel, an altitude, and/or other features. Any point along the road surface may be represented as an offset distance measured from either the starting point or the ending point and along the road link. Any extent of road surface may be represented as a series of complete or partial links defined by offset distances.

The geographic database may also represent static geometries or closed physical areas such as a parking lot, a park, or a body of water. However, the perimeter of the geometry must be estimated or synthetically constructed to fit into the road link model. For example, the perimeter may be estimated using existing road links. In the case of some static geometries such as parks, roads often already closely estimate the perimeter, but in some static geometries such a body of water, roads seldom closely track the perimeter of the geometry. To fill in these shortcomings, virtual road links may be derived for the purpose of representing the perimeter. A virtual road link includes the characteristics of a road in the geographic database, including starting point, ending point, and other attributes, but the virtual road link does not correspond to a physical road. Instead, the virtual road link tracks the border of the static geometry.

Construction of the virtual road link is a computationally intensive process and has several disadvantages. First, virtual road link may not reach every point in the closed physical area and may not reference every point in the closed physical area. For example, in the case of a parking lot, many virtual road links would be needed to blanket the entire area and many virtual road links would be needed to traverse every possible path across the entire area. Second, dynamic closed geometries may not be accurately represented by the link or virtual link techniques. The process of defining and assigning virtual road links is too complicated and requires too much time for a closed geometry that is changing shape or area. Examples of dynamic closed geometries may include oil spill areas, weather areas, hazardous material areas, animal habitat areas, plant growth areas, flood areas, survey opinion statistical areas, political poll areas, or other areas that change shape and are indicated on a map.

Map agnostic coordinates may also reference geometries or physical areas. Map agnostic coordinates include latitude and longitude or other referencing systems that are measured based on the Earth or land, rather than internally to the map tile system. However, the map agnostic coordinates cannot be the only coordinate system used by a navigation application because the map is referenced for road links. Otherwise, the bandwidth requirements for providing basic navigation and map functions becomes very high. Therefore, in practical applications, the end user device switches between map specific references and map agnostic referencing in a variety of techniques, depending on the particular application. Thus, the end user device, including client application software, limited memory, and a limited processor, could be simplified if only a single referencing system was required. Second, map agnostic referencing systems require more data transfer than map references that may be simplified in some applications.

The following embodiments include a map referencing system for representing dynamic closed geometries or closed physical areas using a map tile grid and offset system. The map referencing system is low bandwidth and requires minimal other computing resources because of the optimized overlay and flexible nature of the map tile grid.

FIG. 1 illustrates an example map tile grid 10 overlaid on a map of the world. The map tile grid may be defined according to a normalized Mercator projection. Other projections may be used. The map tile grid 10 is a multilevel grid. Each cell in a level of the map tile grid 10 is divisible into the same number of cell of that same level of grid. In other words, the initial level of the map tile grid 10 is divisible into four cells or rectangles. Each of those cells are in turn divisible into four cells, and so on.

The map tile grid 10 may be numbered is a systematic fashion to define a tile identifier (tile ID). For example, the top left cell may be numbered 00, the top right cell may be numbered 01, the bottom left cell may be numbered 10, and the bottom right cell may be numbered 11. Each cell is divided into four rectangles and numbered by concatenating the parent cell and the new cell position. A variety of numbering schemes are possible. Any number of levels with increasingly smaller geographic areas may represent the map tile grid 10. Any level (n) of the map tile grid 10 has $2^{(n+1)}$ cells. Accordingly, any cell of the level (n) has a geographic area of $A/2^{(n+1)}$ where A is the total geographic area of the world or the total area of the map tile grid 10.

Because of the numbering system, the exact position of any cell in any level of the map tile grid 10 may be uniquely determined from the tile ID. As shown in FIG. 1, the initial position of the top level of the map tile grid 10 includes the South Pacific with New Zealand and southern Australia. However, the map tile grid 10 may be oriented to originate in any of the corners of the globe, as well as any other orientation.

A quadkey may include the tile ID of a cell of the map tile grid 10. The quadkey is a one dimensional array including numerical values. The quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid 10 in order to maintain a constant length for the one dimensional array of the quadkey. In other example, the length of the one dimensional array of the quadkey may indicate the corresponding level within the map tile grid 10.

Figure 2:
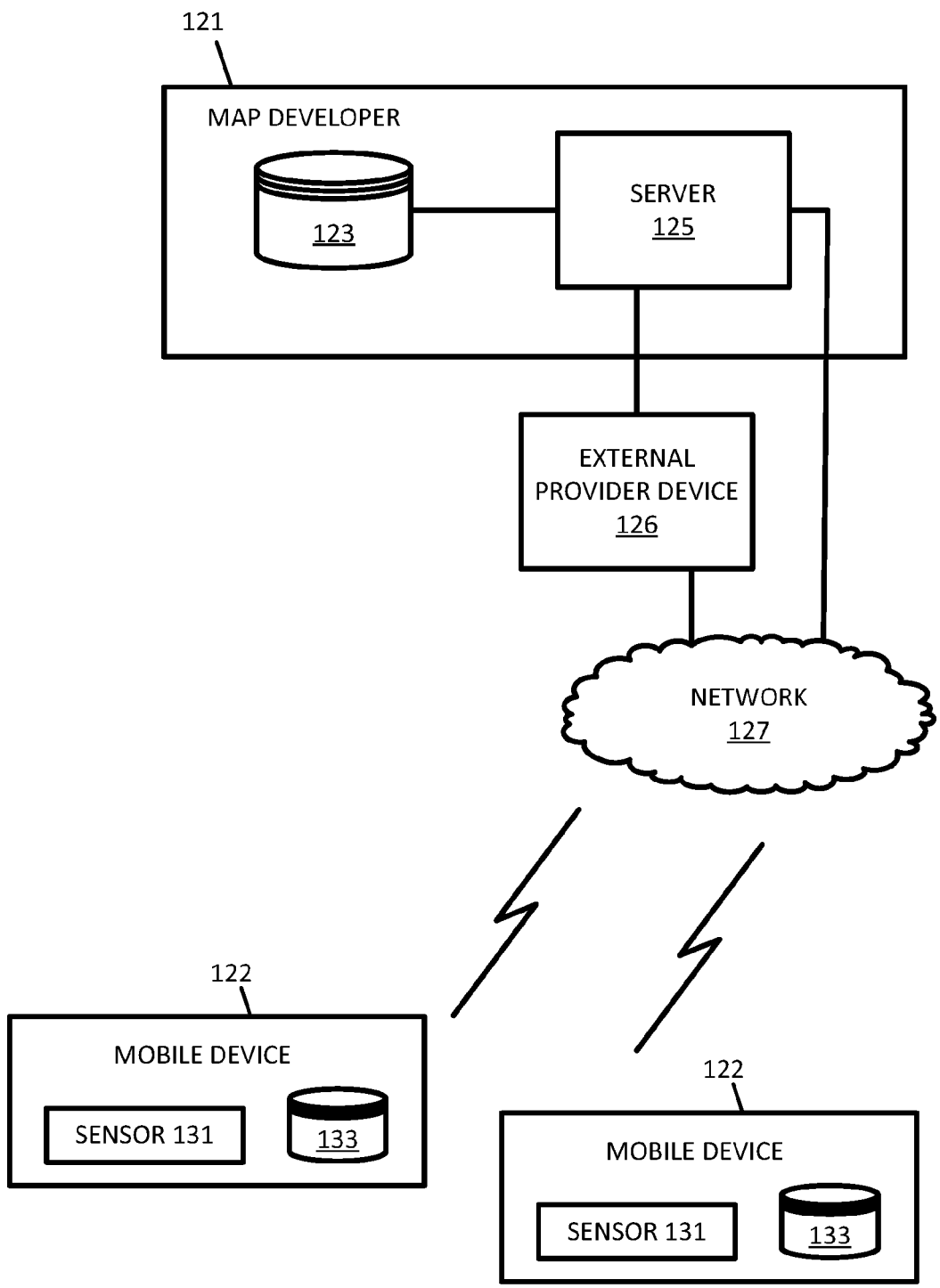
FIG. 2 illustrates an example system for referencing dynamic closed geometries on a map.

FIG. 2 illustrates an example system for referencing dynamic closed geometries on a map. In FIG. 2, one or more mobile device 122 include sensors 131 and are connected to the server 125 though the network 127. A database 123, including the geographic database and/or server map, is also connected to the server 125. The database 123 and the server 125 make up a developer system 121. Multiple mobile devices 122 may be connected to the server 125 through the network 127. The mobile devices 122 include databases 133 corresponding to a local map. Additional, different, or fewer components may be included.

The developer system 121, or specifically server 125, may generate data indicative of the dynamic closed geometry event in map agnostic coordinates. The dynamic closed geometry event may be described in nodes, edges, or vertices. The intersection of edges, the nodes, or the vertices may be referred to as points. A point may be described in two, three, or four dimensions. The dynamic closed geometry event may be described in latitude and longitude coordinates in a plane parallel to the surface of the Earth: (latitude value, longitude value). Optionally, the dynamic closed geometry event may include a time component: (latitude value, longitude value, time value). Finally, the dynamic closed geometry event may include a height value or distance from the plane parallel to the surface of the Earth (latitude value, longitude value, height value, time value). The dynamic closed geometry may be reportedly repeatedly at time intervals, or as information is available, so that the dynamic closed geometry event changes in geographic coverage area over time.

The server 125 is configured to identify a map tile level for a client application executed by the mobile device 122. The client application or a specific mobile device 122 may be assigned to a map tile level. The server 125 is configured to convert the map agnostic coordinates of the dynamic closed geometry to multiple different map tile levels, each corresponding to a different geographic size. For any specific client application, conversion to only one map tile level may be necessary.

Figure 3:
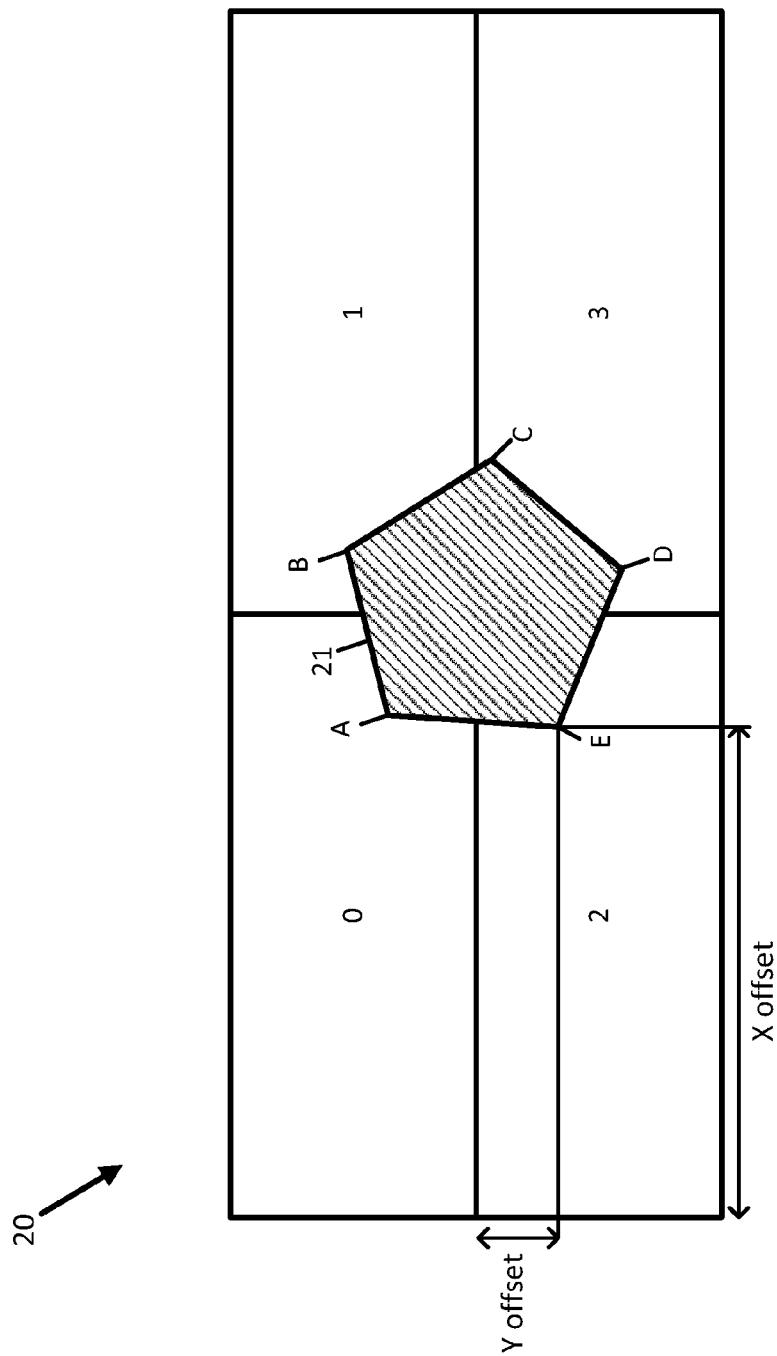
FIG. 3 illustrates an example map tile grid and a dynamic closed geometry.

The server 125 is configured to identify at least one map tile identifier for the dynamic closed geometry event based on the map agnostic coordinates and the identified map tile level. The map tile identifier may be an alphanumeric code that identifies the map tile. Based on the map tile identifier, the server 125 may determine a relative location of point of the dynamic closed geometry. That is, the map agnostic coordinates of the dynamic closed geometry are compared to the confined corresponding area of the selected map tile. The server 125 calculates one or more map tile offsets based on the map tile level and the dynamic closed geometry event FIG. 3 illustrates an example map tile grid 20 and a dynamic closed geometry 21. The map tile grid is divided into four smaller tiles or cells, labeled 0, 1, 2, and 3. The dynamic closed geometry 21 is formed from five points, labeled A, B, C, D, and E. When converting from the map agnostic coordinates to the map tile reference, the server 125 may be determined a X-offset and a Y-offset for the individual cell. The offset may be a decimal or fractional value for the same dimension of the cell. For example, the midpoint of the cell may be indicated by 0.5. The offsets may be measured from any corner of the cell, and the offsets illustrated in FIG. 3 are measured from the top left corner of the cell. In this example, point A is described by a code that is indicative of tile ID 0 an X-offset ($X_A$) and a Y-offset ($Y_A$), point B is described by a code that is indicative of tile ID 1 an X-offset ($X_B$) and a Y-offset ($Y_B$), point C is described by a code that is indicative of tile ID 3 an X-offset ($X_C$) and a Y-offset ($Y_C$), point D is described by a code that is indicative of tile ID 3 an X-offset ($X_D$) and a Y-offset ($Y_D$), and point E is described by a code that is indicative of tile ID 2 an X-offset ($X_E$) and a Y-offset ($Y_E$). Thus, an example code for the dynamic closed geometries defined by the polygon formed from points A, B, C, D, and E is [0, $X_A$, $Y_A$, 1, $X_B$, $Y_B$, 3, $X_C$, $Y_C$, 3, $X_D$, $Y_D$, 2, $X_E$, $Y_E$]. The server 125 may encode the dynamic closed geometry 21 into a quadkey format. Table 1 summarizes the points for the dynamic closed geometry 21. In some examples, when the tile ID is omitted from the code, the server 125 identifies that the subsequent offsets apply to the preceding map tile. Thus, the example code above may be simplified to [0, $X_A$, $Y_A$, 1, $X_B$, $Y_B$, 3, $X_C$, $Y_C$, $X_D$, $Y_D$, 2, $X_E$, $Y_E$].

TABLE 1

| Point | Tile | X-offset | Y-offset |
|---|---|---|---|
| A | 0 | 0.8 | 0.8 |
| B | 1 | 0.2 | 0.6 |
| C | 2 | 0.3 | 0.1 |
| D | 2 | 0.1 | 0.5 |
| E | 3 | 0.8 | 0.2 |

The server 125 is configured to send the at least one map tile identifier and the map tile offsets to the client application executed by the mobile device 122. The at least one map tile identifier and the map tile offsets may be sent as the code, quadkey, or as individual values. The mobile device 122 reconstructs the dynamic closed geometry 21 as the mobile device 122. The client application determines the level of the map tile identifier to selected a portion or area of the map from database 133. From the selected area, the mobile device 122 applies the map tile offset to identify a point of the dynamic closed geometry 21. This process is repeated for the remaining points on the dynamic closed geometry 21. The mobile device 122 draws the closed polygon based on the points.

The construction and transmission of the dynamic closed geometry 21 by the server 125 may be performed as a function of the mobile device 122. The probe 131 may include a position sensor (e.g., global positioning system) that generates position information for the mobile device 122, which provides the position information to the server 125. The server 125 may send a request to the external provider device 126 or the database 123 based on the position information. The server 125 may select the map tile grid 10 based on the position information.

Figure 4:
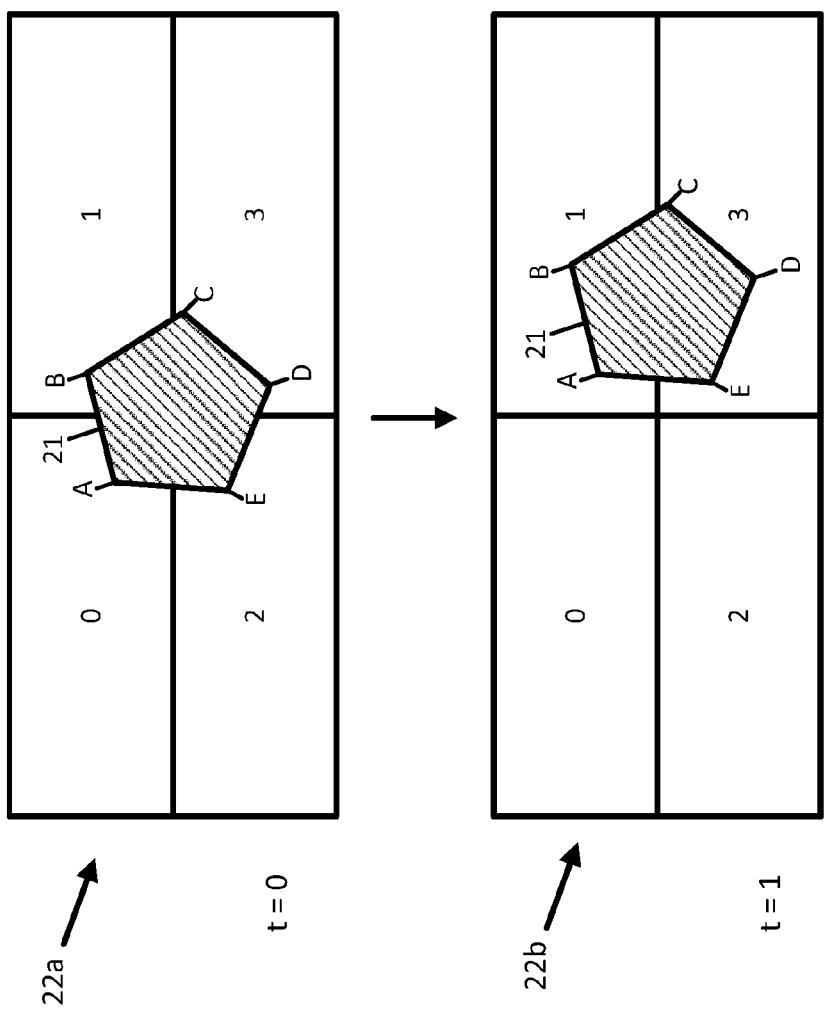
FIG. 4 illustrates an example dynamic closed geometry in motion with respect to the map tile grid over time.

FIG. 4 illustrates an example dynamic closed geometry moving with respect to the map tile grid over time. The dynamic closed geometry may be tracked to any position in the map tile grid. The position of the dynamic closed geometry is independent from road links and nodes. That is, the position of the dynamic closed geometry is unaffected by the existence or positioning of any road links.

At a first time (t=0) or first frame, points A, B, C, D, and E of the dynamic closed geometry 21 are illustrated on the map tile grid 22a at a first position. At a second time (t=1) or second frame, points A, B, C, D, and E are illustrated on the map tile grid 22a at a second position. The first and second positions are defined by tile identifiers and offsets as described above. The time interval for time may be various units of time. The time interval between updates of the dynamic closed geometry 21 may be dependent on the navigation application, which may send requests for the updated position of the dynamic closed geometry. Any subset of the points may move between any two frames (i.e., one or more of the points may remain static between frames).

Figure 5:
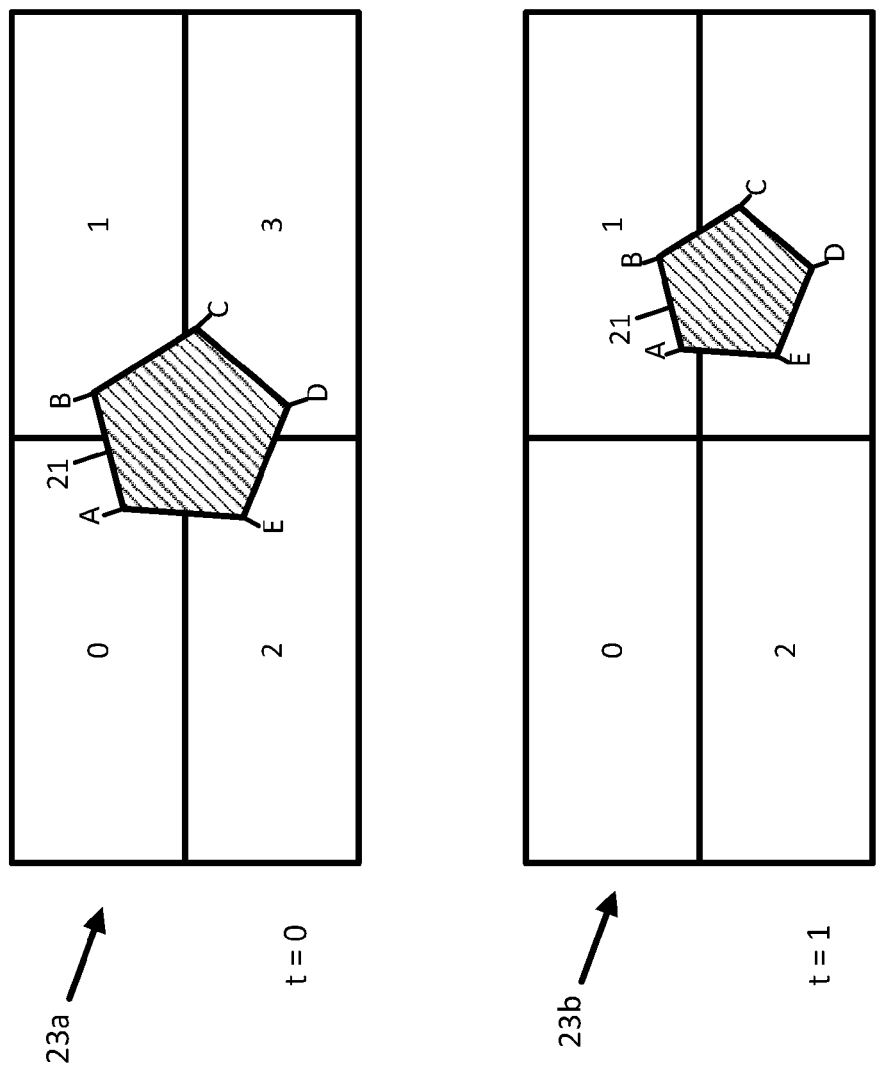
FIG. 5 illustrates another example dynamic closed geometry in motion with respect to the map tile grid over time.

FIG. 5 illustrates another example dynamic closed geometry moving with respect to the map tile grid over time from map tile 23a at a first position and time to map tile 23b at a second position and time. In the example shown in FIG. 5, in addition to moving with respect to the tile boundaries, the dynamic closed geometry 21 changes size. While regular pentagons are shown for ease of illustration, any shape may be used by the dynamic closed geometry 21. A closed geometry is any shape that is totally enclosed by lines. A closed geometry may be defined as a shape that has an area that can be calculated. The closed geometry may include edges that are straight lines or curves. The closed geometry may be a regular shape such that each angle between adjacent edges has the same angle, or angles within a predetermined range. The dynamic closed geometry 21 may change shape between frames.

Figure 6:
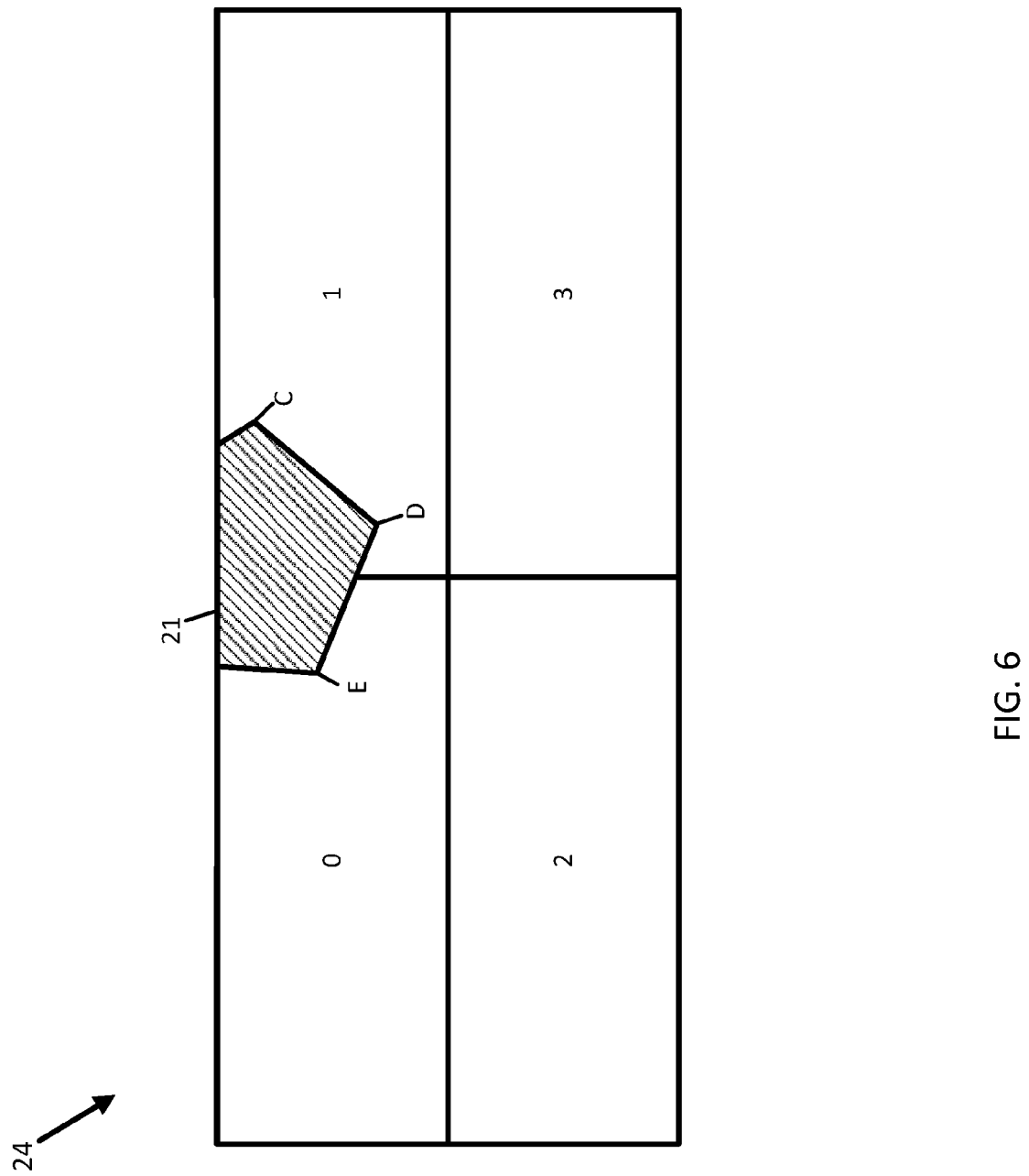
FIG. 6 illustrates another example dynamic closed geometry and map tile grid.

FIG. 6 illustrates another example dynamic closed geometry 21 and map tile grid 24. As shown in FIG. 6, the dynamic closed geometry 21 may change shape dependent on the relative placement in the map tile grid. For example, as describe previously, the map tile grid may depend on the position of the mobile device 122. As the dynamic closed geometry 21 and the mobile device 122 become farther apart, the entire dynamic closed geometry 21 may not be included in the current map tile grid. Thus, when creating the closed geometry from the points C, E, and D, the boundary of the map tile grid forms the required edge to form the dynamic closed geometry 21.

The exchange of data indicative of the dynamic closed geometry event between the server 125 and the mobile device 122 may repeat multiple times such as every predetermined time period or sample period. The exchange of data may repeat on a variable time interval as a function of bandwidth, time of data, or user specific information.

In some examples, the data indicative of the dynamic closed geometry event in map agnostic coordinates originates with the map developer 121. In this instance, the server 125 receives the data indicative of the dynamic closed geometry event in map agnostic coordinates from the database 123. In another example, the data indicative of the dynamic closed geometry event in map agnostic coordinates originates with the external provider device 126.

The external provider device 126 may report variably sized geographic features. The external provider device 126 may be a weather provider system, a traffic provider system, an event provider system, a satellite system, or another provider device. The weather provider system includes one or more weather stations, radar systems or sensor systems for reporting weather events. The sensors 131 may include weather sensors (e.g., rain sensors, pressure sensors, temperature sensors) reported by a network of mobile devices or vehicles and aggregated and analyzed by the external provider device 126. Weather events include storms, tornadoes, fog, rain, or other events, which may make up a dynamic closed shape. The weather events may be described by a dynamic closed shape that corresponds to the effect of the weather such as a slippery road, frost coverage, snow, precipitation or other physical effects on the geographic area resulting from weather.

The traffic provider system may include one or more traffic sensors. The traffic sensors may include traffic cameras or inductive loops. The traffic sensors may be sensors 131 at a network of mobile devices or vehicles and aggregated and analyzed by the external provider device 126. The event provider system may include a calendar of events that may impact traffic.

The satellite system may include a satellite camera that collects images of a geographic area. Images collected by the satellite camera may be analyzed to identify an event represented by a dynamic closed shape. Image processing techniques applied to the camera image may include edge detection or feature transform (e.g., scale-invariant feature transform (SIFT)). The image processing technique may utilize feature vectors. For example, a library of feature vectors from possible expected template may be compared to a set of feature vectors calculated from the satellite image. The event may be traffic identified from slowed or stopped vehicles in the camera image. The event may be a natural disaster such as a flood, hurricane, or a drought identified from the camera image. The event may be a chemical event such as an oil spill, a gas leak, or a smoke cloud. The event may be an explosion, a nuclear blast zone, or a chemical attack.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The server 125 may consult a lookup table to determine the map tile level for the navigation application. A request for information sent from the mobile device 122 to the server 125 may include a type identifier or a name identifier for the navigation application. Example navigation applications include traffic maps, weather maps, point-of-interest (POI) maps, turn-by-turn navigation, POI review applications, friend finder applications, public transit applications, or other applications. The type of the application may be map application (position independent), navigation application (position dependent), social application (dependent on position of other devices), transit application (dependent on vehicles or public transportation). The type of application may be an assisted driving application. The type of application may vary according to manufacturer of the mobile device 122 or the vehicle.

The navigation applications or types of navigation applications may be determined by a client identifier or application identifier. The lookup table may associate the client identifiers or application identifiers with specific map tile levels. Thus, the server 125 may access a lookup table for a client identifier or an application identifier and receive the map tile level from the lookup table in response. The lookup table may associate a tile level for the map applications, a tile level for social applications, a tile level for transit applications, a tile level for weather or traffic applications, and/or a tile level for assisted driving applications. In one example, the tile level for weather or traffic application has a lower granularity, or higher size of the map tile cells, than the tile level for assisted driving applications.

The map offsets calculated by the server 125 may include a height offset or Z-offset corresponding to a height from the plane parallel to the ground plane. The dynamic closed geometry 21 may be three-dimensional. In some examples, a mobile device 122 may be traveling at an X, Y geographic location that is not affected by the event of the dynamic closed geometry 21. The height or Z-offset may correspond to an upper level of a parking garage, a multi-level roadway, or an overpass. The mobile device 122 may be traveling in an airplane or other air vehicle and may request information for weather events for the dynamic closed geometry 21.

Figure 7:
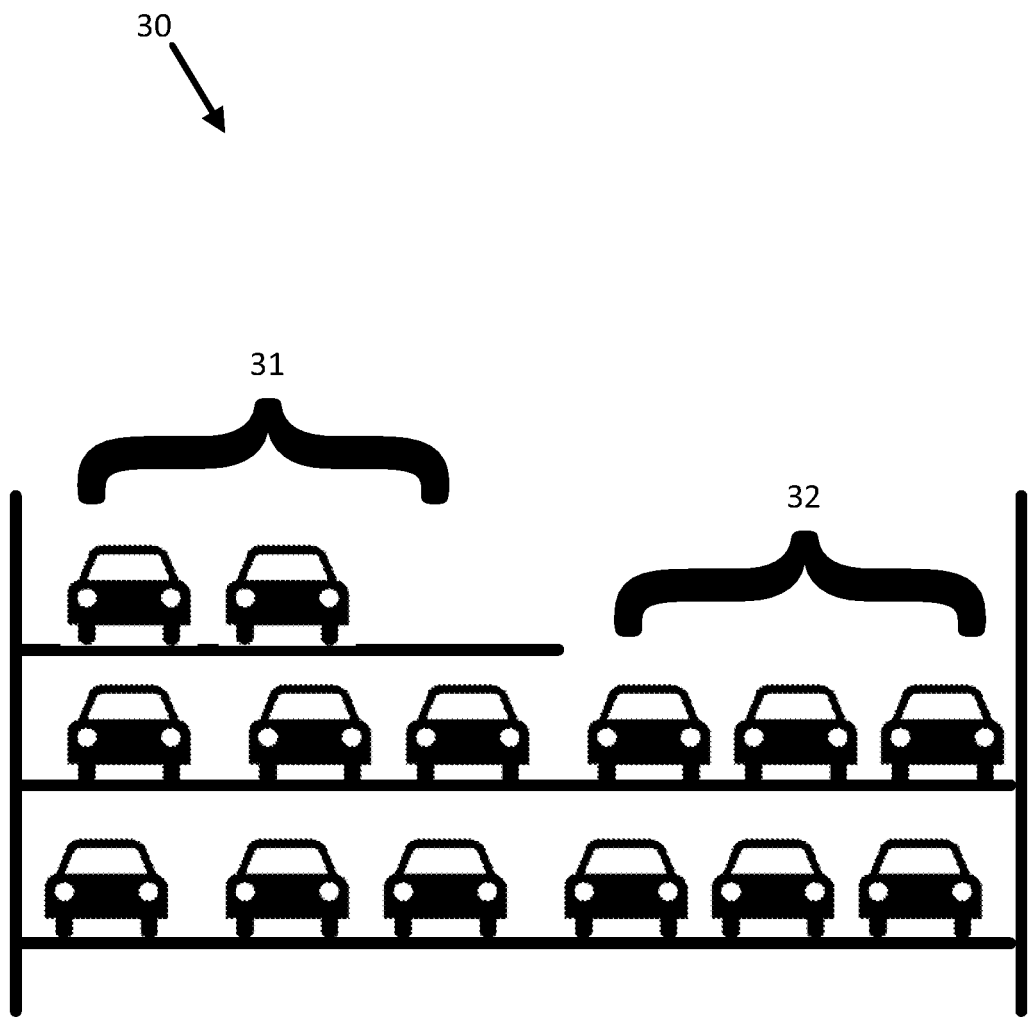
FIG. 7 illustrates an example parking structure operable with a dynamic closed geometry reference.
Figure 8:
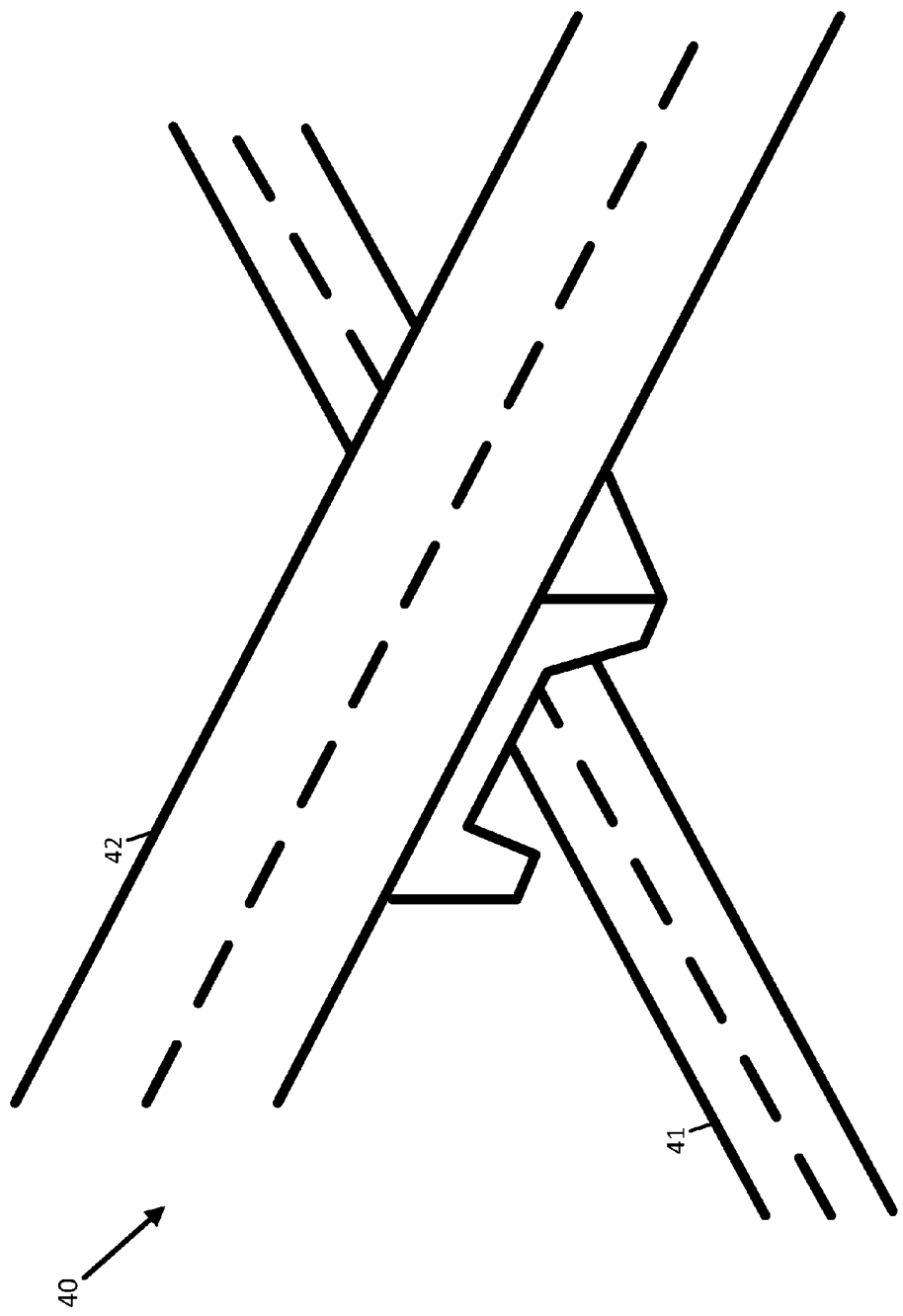
FIG. 8 illustrates an example overpass operable with a dynamic closed geometry reference.

FIG. 7 illustrates an example parking structure operable with a dynamic closed geometry reference. The parking structure includes multiple levels of parked vehicles. Some vehicles in the same vertical level would be effect by the event for the dynamic closed geometry 21 (e.g., rain, snow, or ice). FIG. 8 illustrates an example overpass operable with a dynamic closed geometry reference. Vehicles traveling on lower road 41 are affected differently or at different times than the vehicle traveling on upper road 42. The lower road 41 and the upper road 42 may run in parallel for a geographic distance such that the lower road 41 is covered by the upper road 42.

In one alternative embodiment, an event may be described according to the links an area. For example, a polygon may be defined by three or more points, or a circle defined by a centroid and radius, that are snapped to a nearest point along a link. In another example, the polygon may be defined by a link summary. The link summary may be defined by identifying all of the road links in the area or all the links and optional links in the area. The server 125 may receive the map agnostic coordinates for an event and select all of the road links in the area. The polygon may be defined by the links that form a shortest navigable path for the periphery as well as all the links or partial links that are not necessarily routable that are enclosed inside the polygon.

Figure 9:
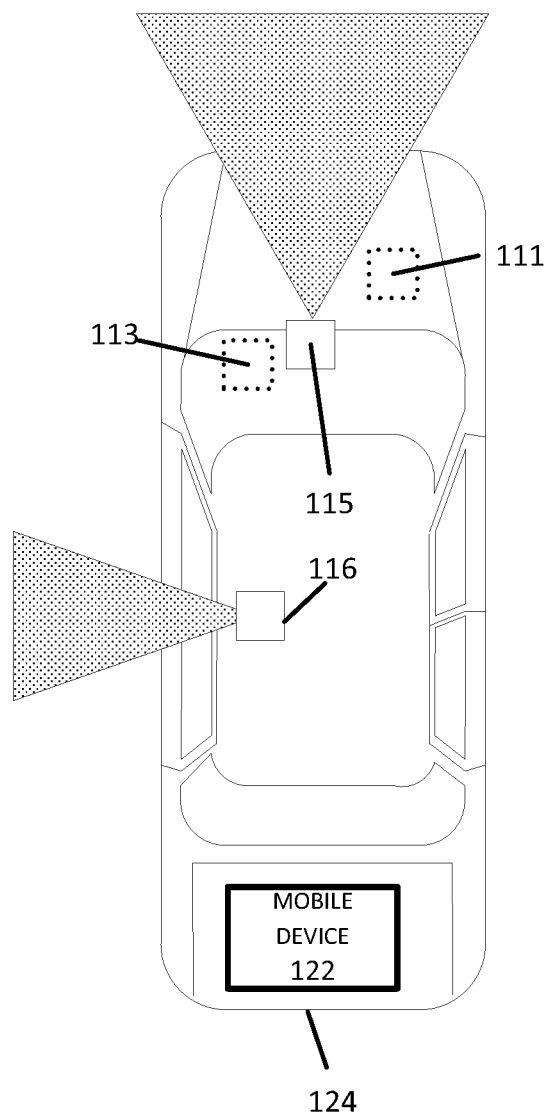
FIG. 9 illustrates an example connected vehicle.

FIG. 9 illustrates an example connected vehicle 124. A connected vehicle includes a communication device and an environment sensor array as sensor 131 for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as light detection and ranging (LiDAR) 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

Figure 10:
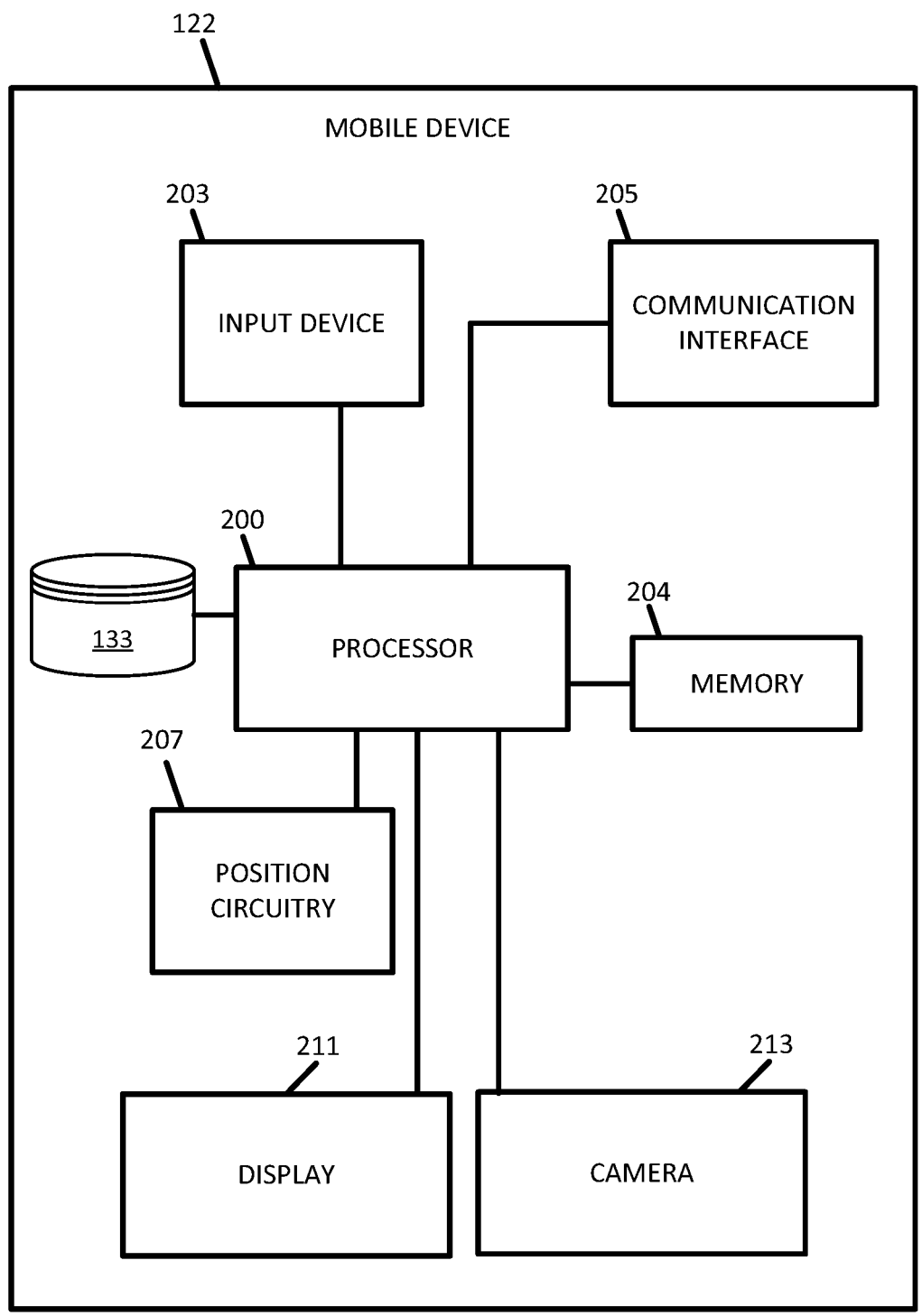
FIG. 10 illustrates an example mobile device.
Figure 11:
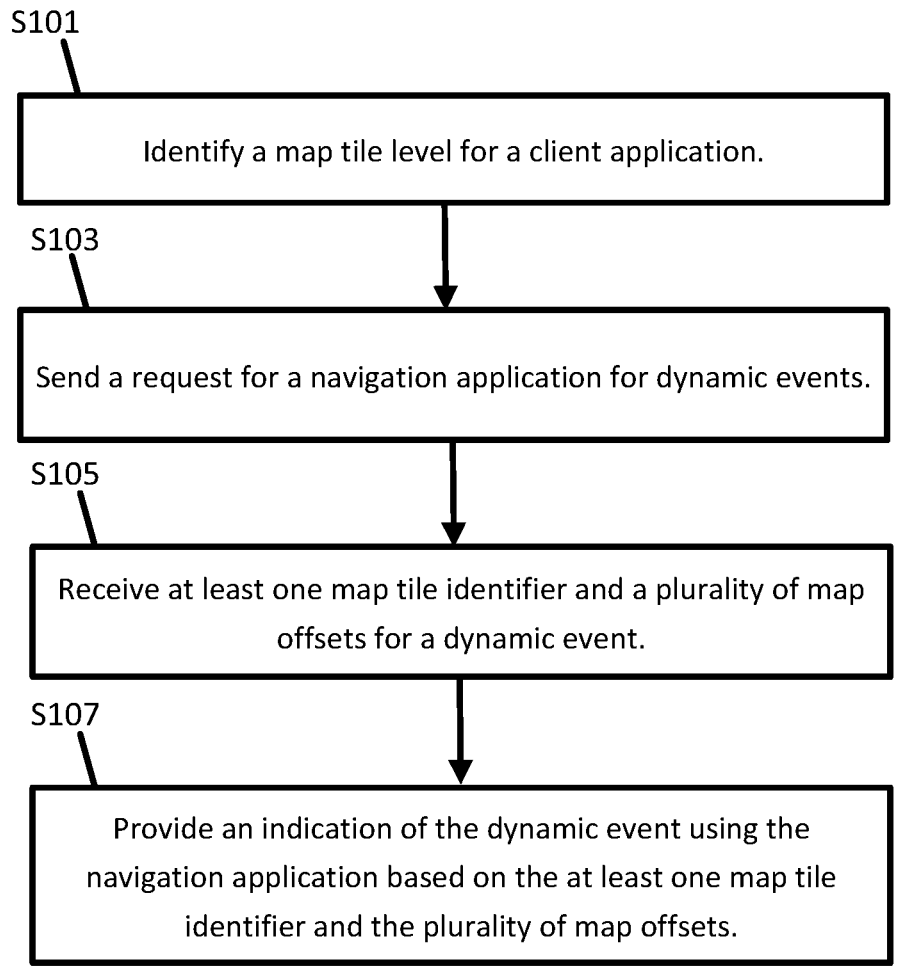
FIG. 11 illustrates an example flowchart for the mobile device of FIG. 10.

FIG. 10 illustrates an exemplary mobile device 122 of the system of FIG. 1. The mobile device 122 includes a processor 200, a vehicle database 133, a memory 204, an input device 203, a communication interface 205, position circuitry 207, a display 211, and a camera 213. Additional, different, or fewer components are possible for the mobile device 122. FIG. 11 illustrates an example flowchart for the mobile device of FIG. 10. Additional, different, or fewer acts may be provided.

At act S101, the processor 200 identifies a map tile level for a client application. The processor 200 may determine the map tile level based on the requirements of the client application. For example, map applications may require a low level of granularity for displaying dynamic closed area events, and assisted driving application may require a high level of granularity for displaying dynamic closed area events. The map tile level may be determined based on a zoom level in the client application. The map tile level may be selected based on the position determined by the position circuitry 207. For example, urban areas may correspond to a higher map tile level or more granularity and rural areas may correspond to a lower map tile level or less granularity.

At act S103, the processor 200 or communication interface 205 sends a request from the navigation application for dynamic events. Alternatively, the dynamic events may be pushed by the server 125. The dynamic events change in geographic coverage area over time. The request may be a message or data packet including the identity of the mobile device 122, a position of the mobile device 122, and/or other information.

At act S105, the processor 200 or communication interface 205 receives at least one map tile identifier and a plurality of map offsets for a dynamic event in response to the request. The server 125 may select the map tile identifier and map offset according to any of the examples herein. The map offsets may be calculated based on the map tile level from other geographic coordinates.

At act S107, the processor 200 or display 211 provides an indication of the dynamic event using the navigation application based on the at least one map tile identifier and the plurality of map offsets. The indication may be a map on display 211.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle and the least one map tile identifier and the map offsets for a dynamic event.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the least one map tile identifier and the map offsets for a dynamic event.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the dynamic closed geometry (e.g., traffic level, weather event or other event) based on the position of the vehicle and the least one map tile identifier and the map offsets for a dynamic event.

The mobile device 122 may generate a routing instruction based on the vehicle database 123. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions described by the dynamic closed geometry 21 may be considered in addition to the cost to determine an optimum route.

Figure 12:
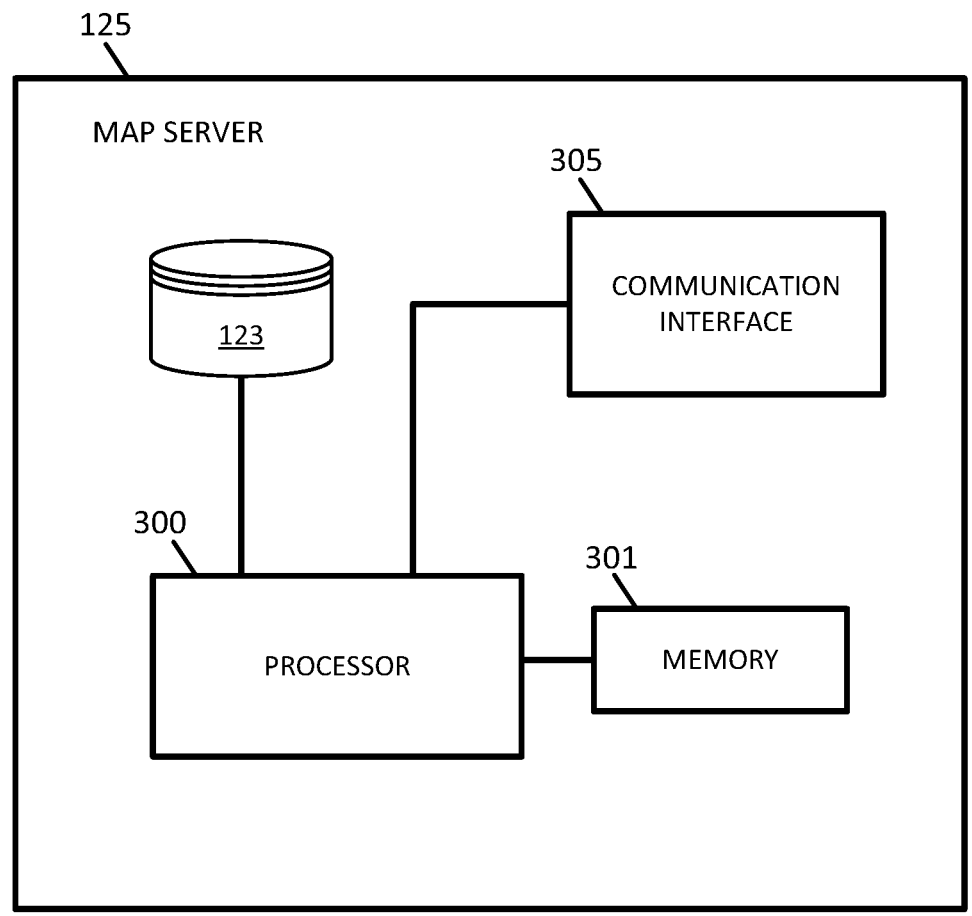
FIG. 12 illustrates an example map server.
Figure 13:
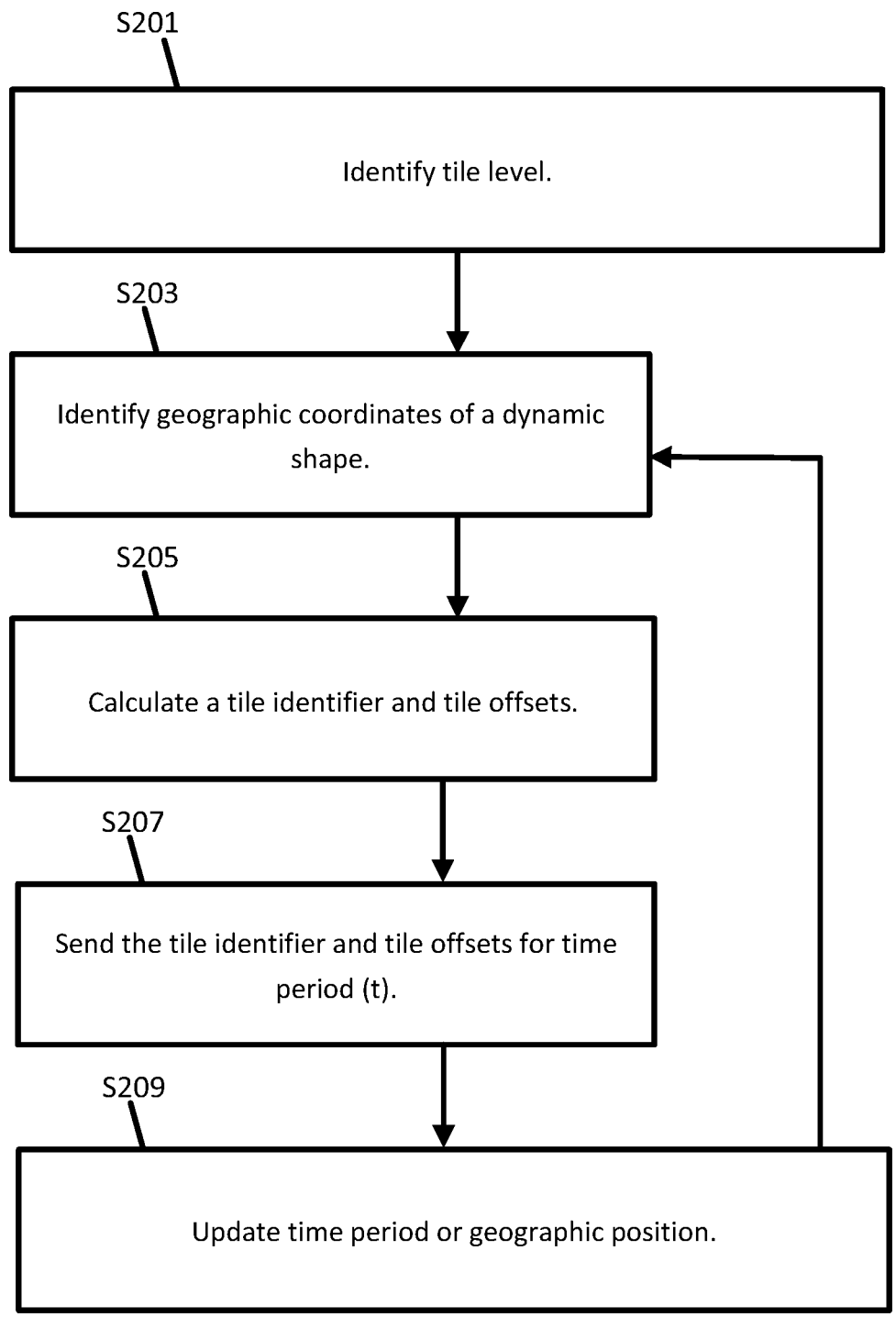
FIG. 13 illustrates an example flowchart for the map server of FIG. 12.

FIG. 12 illustrates an example server 125, which may apply to the system of FIG. 1. The server 125 includes a processor 300, a communication interface 305, a memory 301, and a database 143. An input device (e.g., keyboard or personal computer) may be used to enter settings to the server 125. Additional, different, or fewer components may be provided in the server 125. FIG. 13 illustrates an example flowchart for the operation of server 125. Additional, different, or fewer acts may be provided.

At S201, the processor 300 or the communication interface 305 determines a tile level. In one example, the tile level is a set value. In other examples, the tile level varies over time. The tile level may be dependent on the time of day, the manufacturer of a vehicle associated with the mobile device 122, or a request from the mobile device.

At S203, the processor 300 identifies geographic coordinates of a dynamic shape. The dynamic shape may correspond to an area on a map that changes over time. The dynamic shape may be weather based (e.g., precipitation or fog), condition based (e.g., slippery road or snow coverage), or disaster based (e.g., flood or gas cloud).

At S205, the processor 300 calculates a tile identifier and tile offsets for the dynamic shape from geographic coordinates in another referencing system. The tile offsets may be calculated from the dimensions of the selected map tile. The tile identifier may be a bitwise combination of the geographic coordinates of the map tile or unique sequence of bits for the map tile. The processor 300 is configured to generate a code based on a combination of the map tile identifier and the map tile offsets.

At S207, the communication interface 205 sends the tile identifier and tile offsets for a time period (t). The acts S203 through S207 may be repeated at every periodic time period (e.g., once every second, once every tenth second, one a minute). The acts S203 through S207 may be repeated as a function of change in geographic position determined by the position circuitry 207. As illustrated by act S209, the processor updates the time period or geographic position and repeats.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123, 133, 143, and 163 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method for referencing a dynamic closed geometry event to a map tile for a navigation application, the method comprising:
receiving data indicative of the dynamic closed geometry event in map agnostic coordinates, wherein the dynamic closed geometry event changes in geographic coverage area over time;
identifying, by a processor, a map tile level for the navigation application;
identifying, by the processor, at least one map tile identifier for the dynamic closed geometry event based on the identified map tile level;
calculating, by the processor, a plurality of map tile offsets based on the at least one map tile identifier and the data indicative of the dynamic closed geometry event; and
sending the at least one map tile identifier and the plurality of map tile offsets to the navigation application.

2. The method of claim 1, wherein the data indicative of the dynamic closed geometry event is sensor data received from an external device.

3. The method of claim 1, wherein identifying the map tile level further comprises:
accessing a lookup table for a client identifier or an application identifier; and
receiving the map tile level from the lookup table.

4. The method of claim 3, wherein the lookup table associates assisted driving applications with a first map tile level.

5. The method of claim 4, wherein the lookup table associates traffic or weather applications with a second map tile level.

6. The method of claim 1, wherein the plurality of map tile offsets includes an X-offset and a Y-offset in a plane parallel to a ground plane.

7. The method of claim 6, wherein the plurality of map tile offsets includes a Z-offset describing a height from the plane parallel to the ground plane.

8. The method of claim 7, wherein the height corresponds to an upper level of a parking garage, a multi-level roadway, or an overpass.

9. The method of claim 1, wherein the dynamic closed geometry event includes a first shape at a first time period and a second shape at a second time period.

10. The method of claim 1, wherein the dynamic closed geometry event includes a first area at a first time period and a second area at a second time period.

11. A method for referencing a dynamic event in a map tile, the method comprising:
identifying, by a processor, a map tile level for a navigation application;
sending a request from the navigation application for dynamic events, wherein the dynamic events change in geographic coverage area over time;
receiving, based on the identified map tile level for the navigation application, at least one map tile identifier and a plurality of map offsets for a dynamic event; and
providing an indication of the dynamic event using the navigation application based on the at least one map tile identifier and the plurality of map offsets.

12. The method of claim 11, wherein the navigation application is a first application and the map tile level is a first map tile level, the method further comprising:
identifying, by the processor, a second map tile level for a second application.

13. The method of claim 12, wherein the first application is an assisted driving application.

14. The method of claim 12, wherein the second application is a traffic or weather application.

15. The method of claim 11, wherein the plurality of map tile offsets includes an X-offset and a Y-offset in a plane parallel to a ground plane.

16. The method of claim 15, wherein the plurality of map tile offsets includes a Z-offset describing a height from the plane parallel to the ground plane.

17. The method of claim 11, wherein the dynamic event includes a first shape at a first time period and a second shape at a second time period or a first area at the first time period and a second area at the second time period.

18. An apparatus comprising:
at least one processor; and
at least one memory including computer program code for one or more programs;
the at least one memory and the computer program code configured to, with the at least one processor, cause the apparatus to at least perform:
receive data indicative of the dynamic closed geometry event in geographic coordinates;
identify a map tile level for a mobile device;
identify at least one map tile identifier for the dynamic closed geometry event based on the identified map tile level;
calculate a plurality of map tile offsets based on the map tile identifier and the dynamic closed geometry event; and
generate a code based on a combination of the at least one map tile identifier and the plurality of map tile offsets.

19. An apparatus comprising:
at least one processor; and
at least one memory including computer program code for one or more programs;
the at least one memory and the computer program code configured to, with the at least one processor, cause the apparatus to at least perform:
receive data indicative of a dynamic closed geometry event in map agnostic coordinates, wherein the dynamic closed geometry event changes in geographic coverage area over time;
identify a map tile level;
identify at least one map tile identifier for the dynamic closed geometry event based on the identified map tile level; and
calculate a plurality of map tile offsets based on the at least one map tile identifier and the data indicative of the dynamic closed geometry event.

20. The apparatus of claim 19, the at least one memory and the computer program code configured to, with the at least one processor, cause the apparatus to at least perform:
provide the at least one map tile identifier and the plurality of map tile offsets to a map application.

* * * * *